(12) United States Patent
Tian et al.

(10) Patent No.: US 12,491,645 B2
(45) Date of Patent: Dec. 9, 2025

(54) APPARATUS AND METHOD OF OPERATING TWISTLOCK AND ASSOCIATED ROBOT

(71) Applicant: ABB SCHWEIZ AG, Baden (CH)

(72) Inventors: Ye Tian, Shanghai (CN); Jibo Yang, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 343 days.

(21) Appl. No.: 18/245,094

(22) PCT Filed: Sep. 28, 2020

(86) PCT No.: PCT/CN2020/118358
§ 371 (c)(1),
(2) Date: Mar. 13, 2023

(87) PCT Pub. No.: WO2022/061873
PCT Pub. Date: Mar. 31, 2022

(65) Prior Publication Data
US 2023/0356413 A1    Nov. 9, 2023

(51) Int. Cl.
| | |
|---|---|
| *B25J 15/08* | (2006.01) |
| *B23P 19/00* | (2006.01) |
| *B25J 11/00* | (2006.01) |
| *B25J 15/00* | (2006.01) |
| *B25J 15/04* | (2006.01) |
| *B65D 90/00* | (2006.01) |

(52) U.S. Cl.
CPC ............ *B25J 15/08* (2013.01); *B25J 11/005* (2013.01)

(58) Field of Classification Search
CPC . B25J 15/08; B25J 11/005; B25J 11/00; B25J 15/0033; B25J 15/0042; B25J 15/0475; B65D 90/002; B23P 19/00
See application file for complete search history.

(56) References Cited

U.S. PATENT DOCUMENTS

| | | | |
|---|---|---|---|
| 9,505,336 B2 | 11/2016 | Royt | |
| 2014/0102239 A1 | 4/2014 | Umeno | |
| 2019/0039826 A1* | 2/2019 | Luckinbill | ............. B25J 9/0084 |

FOREIGN PATENT DOCUMENTS

| | | | |
|---|---|---|---|
| CN | 1490133 A | * | 4/2004 |
| CN | 105312888 A | | 2/2016 |
| CN | 105880989 A | * | 8/2016 |
| CN | 106002134 A | | 10/2016 |

(Continued)

*Primary Examiner* — Harry Y Oh
(74) *Attorney, Agent, or Firm* — GREENBERG TRAURIG, LLP

(57) ABSTRACT

Embodiments of the present disclosure provide an apparatus and a method for operating a twistlock and an associated robot. The apparatus comprises a clamping assembly comprising a plurality of pairs of clamping portions spaced apart by different distances and adapted to engage with different types of twistlocks, respectively; and an operating assembly adapted to drive one of the plurality of pairs of clamping portions to clamp the twistlock and to drive the clamped twistlock to rotate, to allow the clamped twistlock to be mounted on or removed from a container. In this way, the apparatus according to embodiments of the present disclosure can be applied to most types of twistlocks without changing the clamping assembly, thereby improving the operation efficiency and reducing the costs.

20 Claims, 15 Drawing Sheets

(56) References Cited

FOREIGN PATENT DOCUMENTS

| | | |
|---|---|---|
| CN | 207107488 U | 3/2018 |
| CN | 107934265 A | 4/2018 |
| CN | 108555565 A | 9/2018 |
| CN | 208307508 U | 1/2019 |
| CN | 208391402 U | 1/2019 |
| CN | 209112806 U | 7/2019 |
| WO | 2012141658 A2 | 10/2012 |

* cited by examiner

APPARATUS AND METHOD OF OPERATING TWISTLOCK AND ASSOCIATED ROBOT

CROSS-REFERENCE TO RELATED APPLICATIONS

This is a national stage application claiming priority to International patent application Serial No.: PCT/CN2020/118358, filed on Sep. 28, 2020; which is herein incorporated by reference in its entirety.

FIELD

Embodiments of the present disclosure generally relate to a robot, and more specifically, to an apparatus and a method of operating a twistlock using a robot.

BACKGROUND

A twistlock and corner casting together form a standardized rotating connector for securing shipping containers. The primary uses of twistlocks are for locking stacked containers on a container ship.

Many types of twistlocks, such as manual twistlocks, semi-automatic twistlocks or fully automatic twistlocks, can be used between the containers in a stack. "In the stack" means that there will be a container both above and below the twistlock. Each type of twistlock has many different structures. It is tedious and dangerous work to install or remove the twistlock on or from the container.

To perform the tedious and dangerous work with safe efficient operations, some automated twistlock handling robots have been proposed. WO2012141658A2 discloses an automatic stevedore remote station having a camera that can detect the presence, distance, shape and orientation of a twistlock via machine vision. The automatic stevedore remote station also has a gripper and a twister which can move to the detected twistlock and remove/install the twistlock from/onto a shipping container. The automatic stevedore remote station is provided in the form of an industrial robot that can move both the camera and its end effector together.

SUMMARY

Embodiments of the present disclosure provide an apparatus and a method for operating a twistlock and an associated robot, to at least in part solve the above and other potential problems.

A first aspect is an apparatus for operating a twistlock. The apparatus comprises a clamping assembly comprising a plurality of pairs of clamping portions spaced apart by different distances and adapted to engage with different types of twistlocks, respectively; and an operating assembly adapted to drive one of the plurality of pairs of clamping portions to clamp the twistlock and to drive the clamped twistlock to rotate, to allow the clamped twistlock to be mounted on or removed from a container.

With the clamping assembly comprising a plurality of pairs of clamping portions spaced apart by different distances, the apparatus according to embodiments of the present disclosure can be applied to most types of twistlocks without changing the clamping assembly, thereby improving the operation efficiency and reducing the costs for the quick-change equipment.

In some embodiments, the operating assembly comprises a translating mechanism adapted to drive one of the plurality of pairs of clamping portions to move away or close to each other to clamp or release the twistlock; and a rotating mechanism adapted to drive the clamped twistlock to rotate. This arrangement can accomplish the operating assembly more easily.

In some embodiments, the apparatus further comprises a switch operating assembly comprises at least one sub-assembly adapted to operate different switches of the different types of twistlocks to allow the twistlock to be rotated by the operating assembly. The switch operating assembly enables a wider application range of the apparatus, for example, the apparatus can be applied to a variety of twistlocks with switches.

In some embodiments, the switch operating assembly comprises a first switch sub-assembly adapted to be coupled to a first switch of a first type of twistlock and to operate the coupled first switch to allow the twistlock to be rotated.

In some embodiments, the first switch sub-assembly comprises a first effector; a first driving component adapted to drive the first effector to be coupled to the first switch; and a first operating component adapted to drive the coupled first switch to translate to an unlocked position, to allow the twistlock to be rotated. This arrangement can accomplish the switch operating assembly more easily.

In some embodiments, the switch operating assembly further comprises a second switch sub-assembly adapted to be coupled to a second switch of a second type of twistlock and to operate the coupled second switch to allow the twistlock to be rotated.

In some embodiments, the second switch sub-assembly comprises a second effector; a second driving component adapted to drive the second effector to be coupled to the second switch; and a second operating component adapted to drive the coupled second switch to rotate to an unlocked position, to allow the twistlock to be rotated.

In some embodiments, the second operating component adapted to drive at least one of the second driving component or the first switch sub-assembly to rotate. This arrangement can make the control of the apparatus more flexible.

In some embodiments, the plurality of pairs of clamping portions are adapted to engage with the different types of twistlocks at different distances from the container. This arrangement makes it more flexible when clamping the twistlock.

In some embodiments, the operating assembly is adapted to be coupled to a tool flange of a robot, to enable the robot to drive the apparatus to rotate and/or translate. This arrangement allows the apparatus to be controlled more flexibly.

In some embodiments, the operating assembly is coupled to the tool flange to allow the robot to drive the apparatus to rotate about a plurality of axes and/or to translate in a plurality of directions.

In a second aspect, a robot is provided. The robot comprises an apparatus according to the first aspect as mentioned above.

In a third aspect, a method of operating a twistlock with a robot as mentioned according to the second aspect is provided. The method comprises determining a type of the twistlock to be operated; determining a pair of clamping portions according to the determined type of the twistlock; controlling the determined pair of clamping portions to be coupled to the twistlock; and controlling the clamping assembly to rotate to allow the clamped twistlock to be mounted on or removed from a container. This method makes it possible to use the robot to automatically operate multiple types of twistlocks.

In some embodiments, the method further comprises determining a sub-assembly from a switch operating assembly according to the determined type of the twistlock; controlling the determined sub-assembly to operate the switch of the twistlock to allow the twistlock to be rotated by the operating assembly. This method further enables the corresponding switch to be automatically unlocked according to the type of twistlock, thereby increasing the degree of automation.

In some embodiments, the method further comprises controlling the apparatus to rotate about at least one axis and/or to move in at least one direction.

It is to be understood that the Summary is not intended to identify key or essential features of embodiments of the present disclosure, nor is it intended to be used to limit the scope of the present disclosure. Other features of the present disclosure will become readily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, the same reference numerals usually represent the same components.

Throughout the drawings, the same or similar reference symbols are used to indicate the same or similar elements.

DETAILED DESCRIPTION

Figure 1:
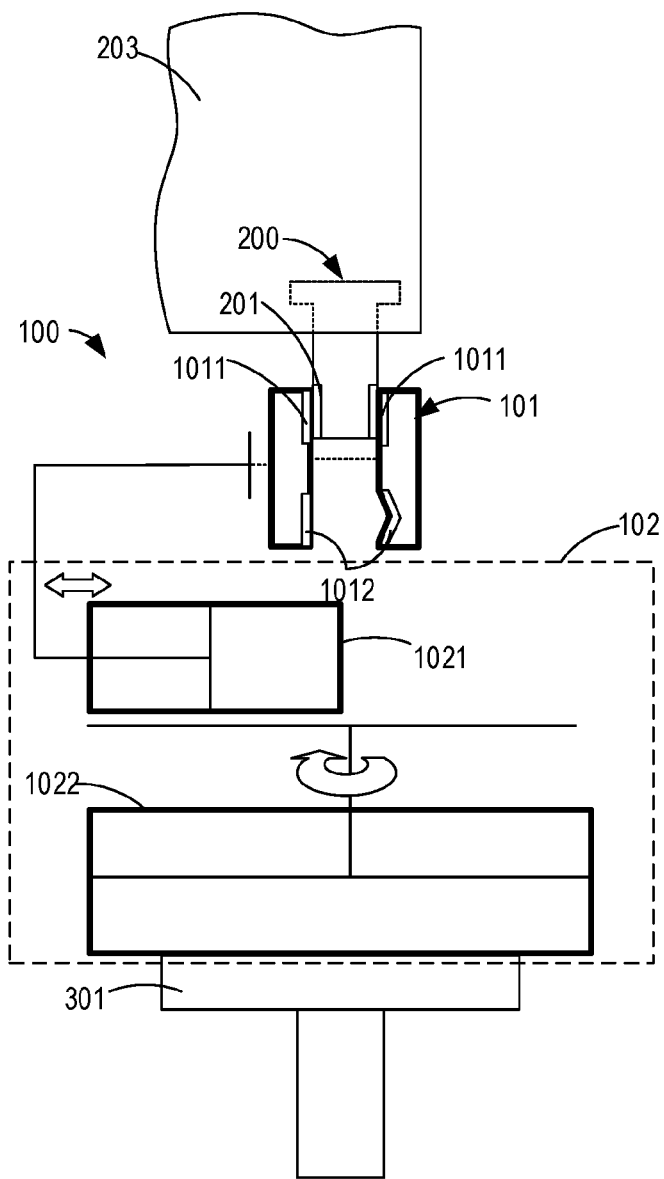
FIG. 1 shows a simplified view of an apparatus for operating a twistlock according to embodiments of the present disclosure.

The present disclosure will now be discussed with reference to several example embodiments. It is to be understood these embodiments are discussed only for the purpose of enabling those persons of ordinary skill in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

For a long time, the handling of twistlocks and semi-automated twistlocks has been a heavy burden for the container industry. The burden consists of the operational cost to place and remove these twistlocks in every step of the container supply chain (on the vessel, on road trucks and on trains). Moreover, the handling typically takes place in areas where dense traffic takes place, such as the apron of a container terminal, or where inherently unsafe situations take place, such as the hold of the vessel, or close to moving containers. It is therefore often a source of injuries or casualties.

There have been many robots developed for automated twistlock handling stations, which could carry out this placement and removal of the twistlocks. Although various robots have been developed, it has not led to a large-scale application. The main reason for this phenomenon is that the robots cannot be applied to all types, or most types of twistlocks that need to be handled.

Specifically, there are at least six types of twistlocks commonly used between containers, which are totally different from each other both in their structures and in methods of operation. For example, some simple twistlocks can be taken out of the container by rotating a certain angle around a vertical axis after being clamped. Some other twistlocks can be rotated only after a switch thereof is unlocked. In addition, for twistlocks with switches, the method of operating the switches is different. For example, some twistlock switches need to be pulled out a certain length, and some other switches need to be turned a certain angle to unlock the switches.

Even after the switches are unlocked, in addition to rotating a certain angle around the vertical axis, some other twistlocks also need to be deflected by a certain angle around another axis such as a horizontal axis before they can be removed from the container. Furthermore, some other twistlocks need to be tilted at a certain angle around another horizontal axis to be removed from the container while rotating a certain angle around the vertical axis and deflecting a certain angle around the horizontal axis.

In addition, the structures of twistlocks also lead to different clamping positions. For example, some traditional twistlocks are provided with portions dedicated to a clamping component, which usually have standard sizes. However, for some other twistlocks, there is no special portion for clamps or manual clamping. Therefore, it is usually necessary to design a special clamping component to clamp them. In sum, the above-mentioned various factors lead to poor versatility of conventional robots.

To improve the versatility of the robots, some conventional robots can target different types of twistlocks by changing clamping components. When removing different twistlocks from the containers, the robot needs to constantly replace the corresponding clamping components. Although the replacement of clamping components can be performed by a quick-change equipment, the replacement is still time-consuming. In addition, the quick-change equipment usually has a complicated structure, resulting in a high cost for the quick-change equipment. These factors result in high costs and low efficiency in operating twistlocks.

In order to at least partially address the above and other potential problems, embodiments of the present disclosure provide an apparatus 100 for operating a twistlock 200. FIG. 1 shows a simplified view of an apparatus 100 for operating a twistlock 200 according to embodiments of the present disclosure. It is to be appreciated that the operation of the twistlock mentioned herein refers to the removal or installation of the twistlock from the container 203. Embodiments of the present disclosure will be described mainly by taking the removal of a twistlock 200 from a container 203 as an example. It is to be understood that the operation of mounting a twistlock 200 into a container 203 is similar, and will not be described separately in the following.

As shown in FIG. 1, generally, the apparatus 100 according to embodiments of the present disclosure comprises a clamping assembly 101 and an operating assembly 102. The apparatus 100 may be coupled to a tool flange 301 of a robot 300. In this way, the robot 300 can drive the apparatus 100 to rotate and/or translate. For example, in some embodiments, the robot 300 can drive the apparatus 100 to rotate about a plurality of axes that are perpendicular to or parallel to each other. Alternatively or additionally, in some embodiments, the robot 300 also can drive the apparatus 100 to translate in a plurality of directions, allowing the apparatus 100 to be controlled more flexibly. In this way, most twistlocks, whether they are those that can be removed by only rotating them, or those that require deflection and/or tilt to be removed after rotation, can be removed by robot 300 with the apparatus 100, thereby improving the efficiency in operating twistlocks.

In contrast to the conventional clamping apparatus 100 used in the robot 300, the clamping assembly 101 comprises a plurality of pairs of clamping portions which are spaced apart by different distances. In this way, different types of twistlocks with different engagement structures can be clamped with the clamping assembly 101.

Figure 2:
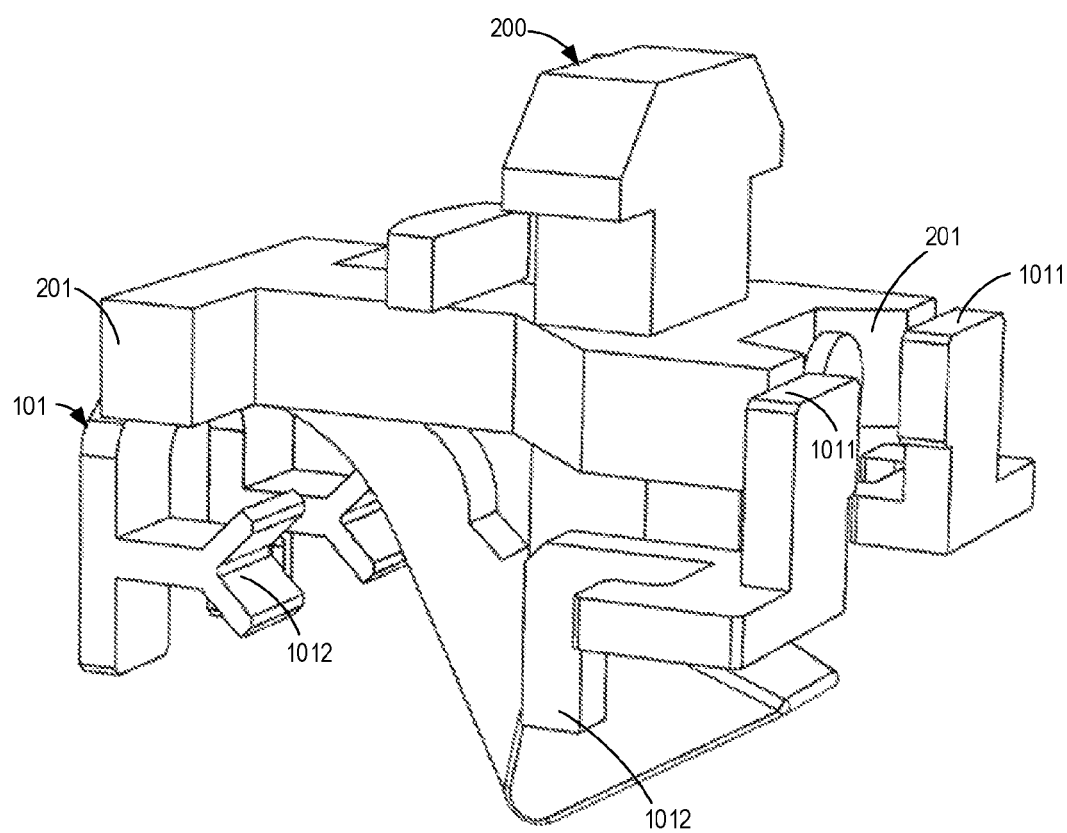
FIG. 2 shows a perspective view of a clamping assembly with a twistlock clamped by a first clamping portion according to embodiments of the present disclosure.
Figure 3:
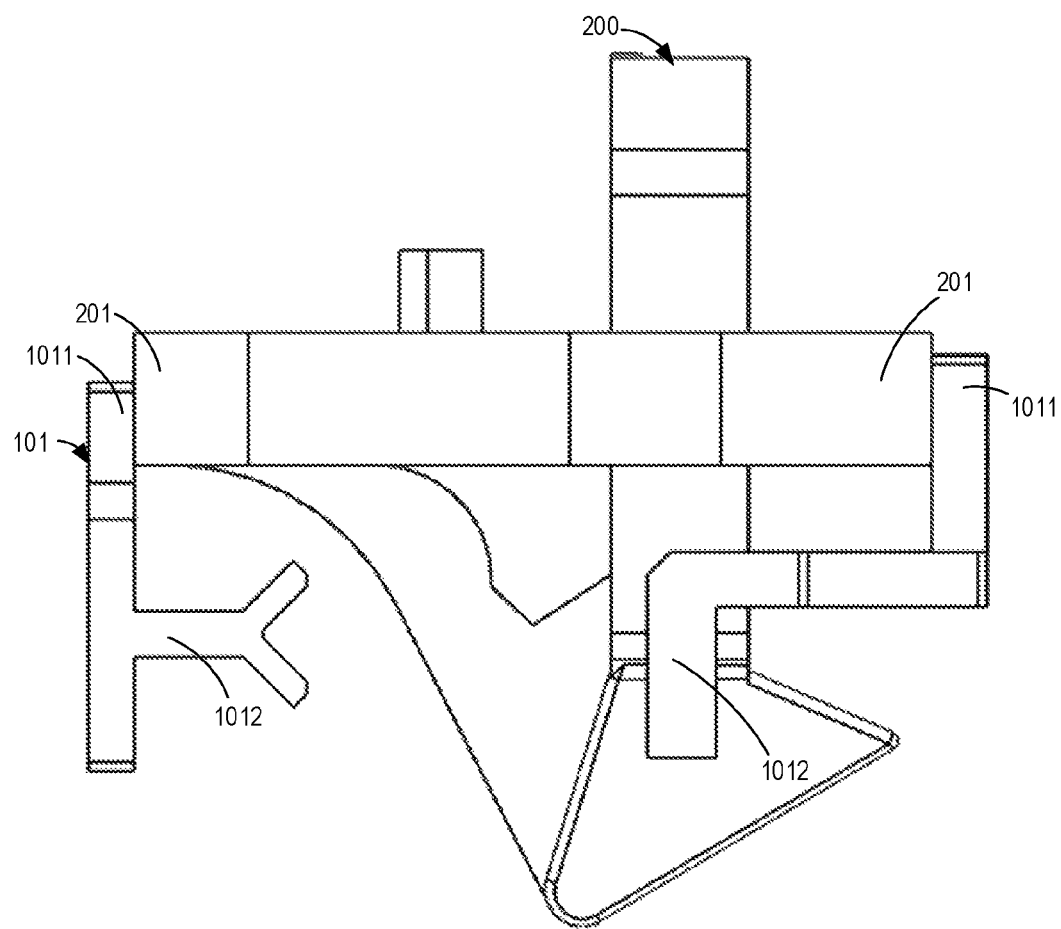
FIG. 3 shows a side view of a clamping assembly with a twistlock clamped by a first clamping portion according to embodiments of the present disclosure.

For example, for those twistlocks 100 with engagement portions 201 dedicated to a clamping component as mentioned above, one pair of clamping portions, namely, a first pair of clamping portions 1011, may be used to engage with, for example, to abut against the engagement portions 201 to clamp the twistlock 200, as shown in FIGS. 2 and 3. A distance between the first pair of clamping portions 1011 may be adjusted by the operating assembly 102. For example, the first pair of clamping portions 1011 may be driven to move away or close to each other to clamp or release the twistlock 200, which makes the clamping for the twistlock 200 more flexible.

In some alternative embodiments, due to the standard size of the engagement portion 201 to be clamped, the distance between the first pair of clamping portions 1011 may also be fixed. For example, the first pair of the clamping portions 1011, as long as it does not interfere with twistlocks and containers, may be integrally formed with a clamping size matching the standard size of the engagement portion 201.

For those twistlocks without dedicated engagement portions 201, the inventors have discovered that the size of a lower part of these twistlocks is fixed, because the lower part of these twistlocks needs to be inserted into a standard-sized slot of a lower container 203. In comparison to the dedicated engagement portions for clamping as mentioned above, the lower part usually has a smaller size, resulting in the first pair of clamping portions 1011 being unable to clamp the lower part firmly due to interference. To firmly clamp those twistlocks without dedicated engagement portions 201, a second pair of clamping portions 1012 spaced apart by a smaller distance than the first pair of clamping portions 1011 is provided.

Figure 4:
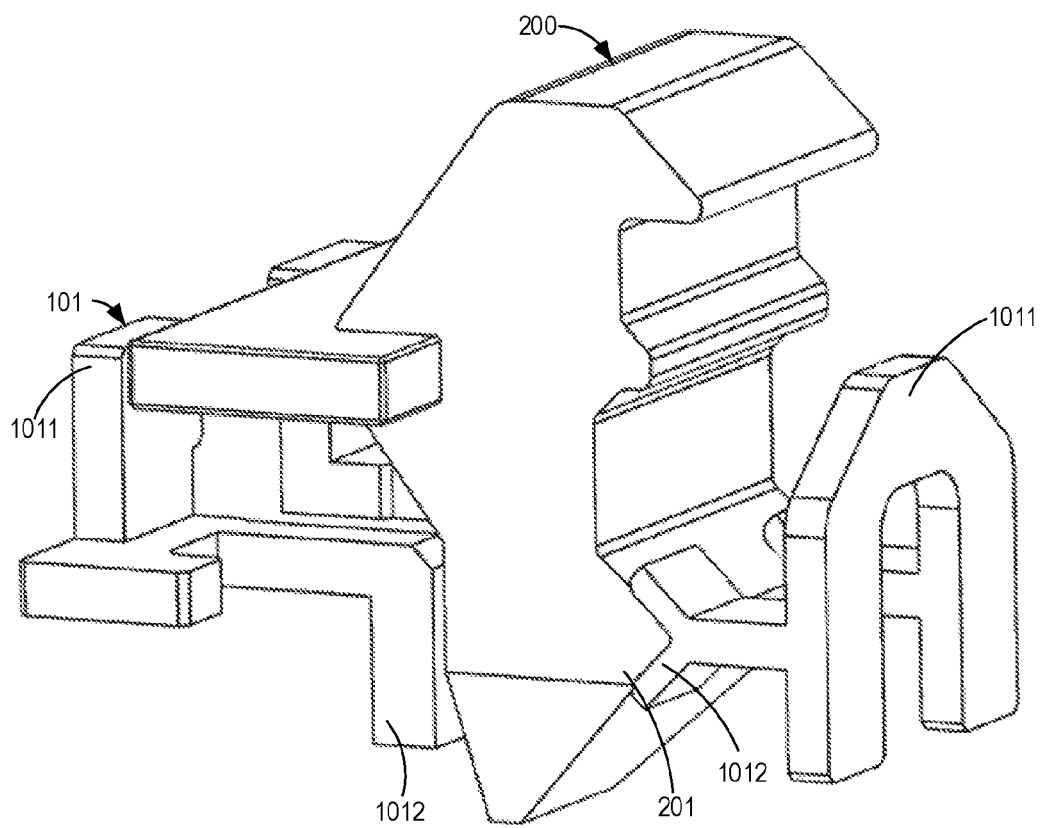
FIG. 4 shows a perspective view of a clamping assembly with a twistlock clamped by a second clamping portion according to embodiments of the present disclosure.
Figure 5:
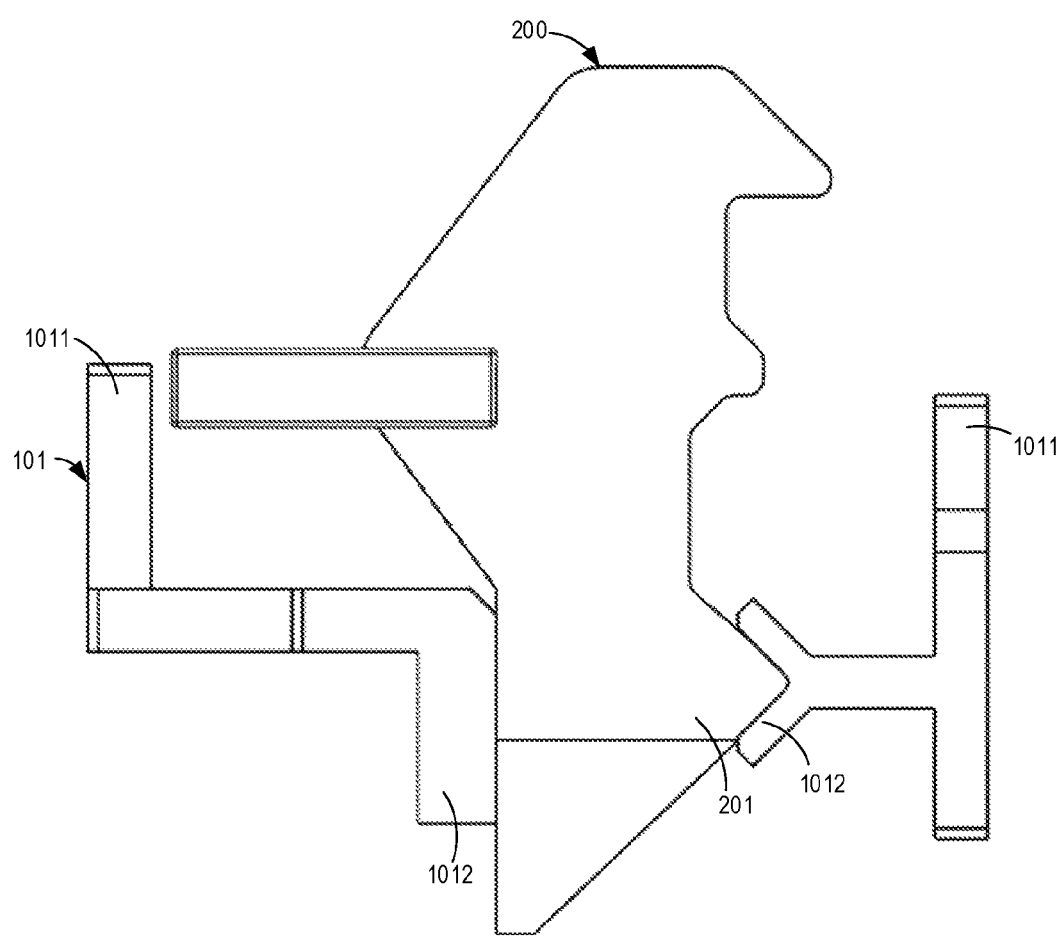
FIG. 5 shows a side view of a clamping assembly with a twistlock clamped by a second clamping portion according to embodiments of the present disclosure.

The second pair of clamping portions 1012 can abut against other engagement portions 201 located at the lower part to clamp the twistlock 200, as shown in FIGS. 4 and 5. In this way, the clamping assembly 101 with the first and second pairs of clamping portions 1011, 1012 can be applied to most types of twistlocks without changing the clamping assembly 101, thereby improving the efficiency and reducing the costs for operating the twistlocks.

To firmly clamp the lower part of the twistlock which is not flat, in some embodiments, the second pair of clamping portions 1012 may be shaped to match the shape of the engagement portion 201 of the lower part. For example, since the engagement portion 201 of the lower part of the twistlocks usually has an inclined shape to facilitate insertion of the lower part into the lower container 203, the second pair of clamping portions 1012 may have a corresponding concave shape to abut against the inclined shape of the engagement portion 201, as shown in FIGS. 4 and 5. In this way, the twistlocks 100 can be firmly clamped.

In some embodiments, the engagement portion 201 of the twistlock 200 may be located at different distances from the container 203. For example, the engagement portion 201 dedicated to the clamping component is typically closer to an upper container than the engagement portion located at the lower part. Accordingly, the plurality of pairs of the clamping portions are adapted to engage with the different engagement portions 201 at different distances from the container 203. This arrangement can avoid interference during the operation, making the control for the operation more flexible when clamping the twistlock 200.

Figure 6:
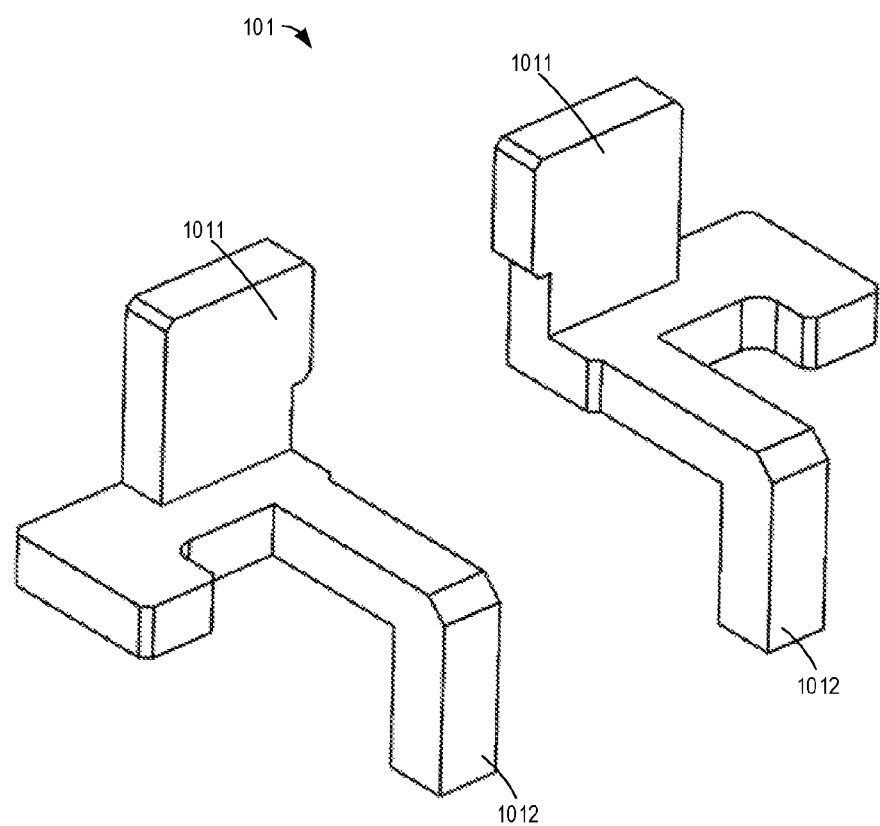
FIGS. 6 and 7 shows a perspective view of two parts of a clamping assembly according to embodiments of the present disclosure.
Figure 7:
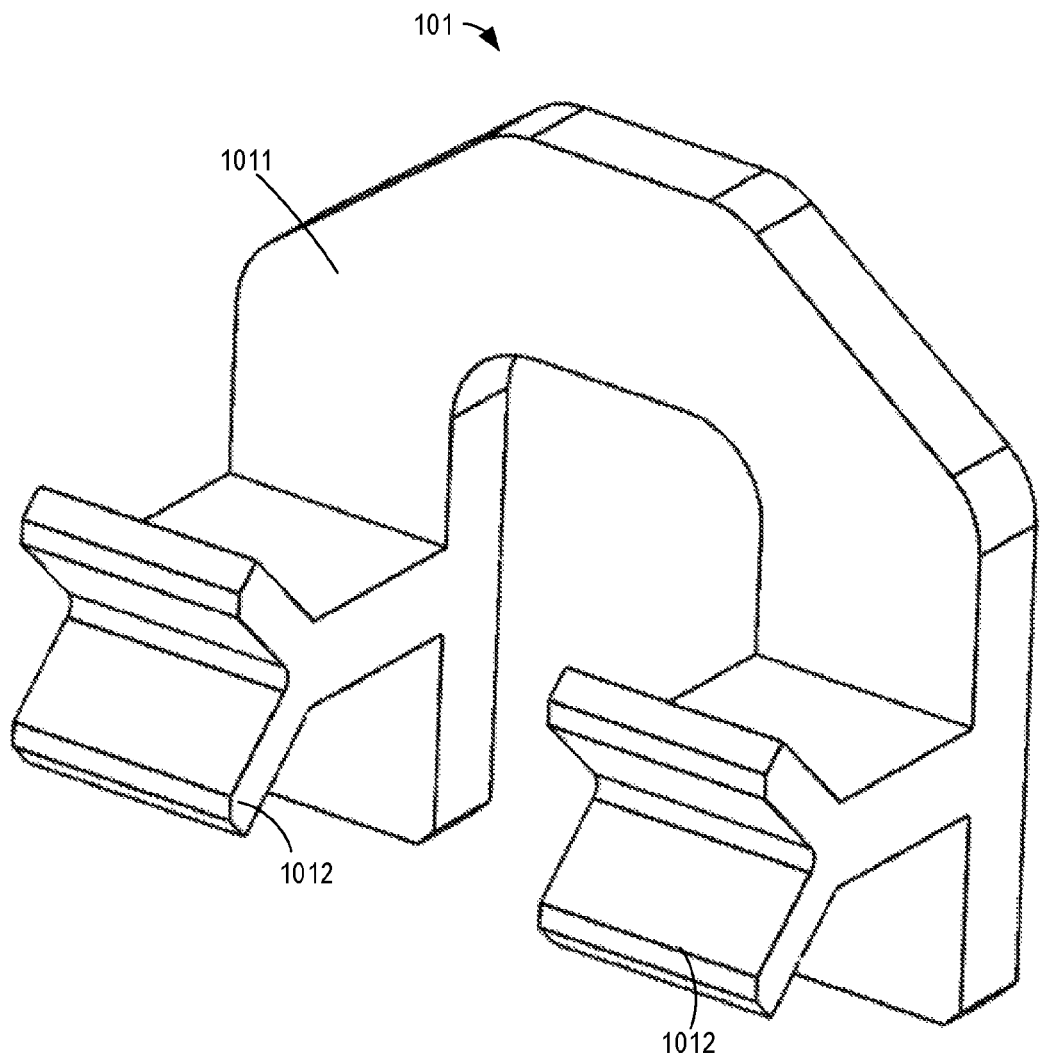

FIGS. 6 and 7 show perspective views of two parts, namely, a left part and a right part of a clamping assembly 101. In some embodiments, a half of the first pairs of clamping portions is formed on the left part and another half is formed on the right part. Similarly, a half of the second pair of clamping portions 1012 is formed on the left part and another is formed on the right part. In some embodiments, the left part or the right part may be integrally formed. For example, as shown in FIG. 7, the right part of the clamping assembly 101 is integrally formed, which can simplify assembly of the clamping assembly 101 while increasing strength.

In some alternative embodiments, the left part or the right part may also be separately formed and then mounted together. For example, as shown in FIG. 6, the left part may comprise two separate portions which may be mounted on a plate together. In this way, the assembling of the clamp assembly can be more flexible and can be adapted to engagement portions 201 of various sizes.

The operating assembly 102 can drive the clamping assembly 101 to clamp and release the twistlock. After driving the clamping assembly 101 to firmly clamp the twistlock 200, the operating assembly 102 also drives the clamped twistlock 200 to rotate, for example around a vertical axis, to allow the clamped twistlock 200 to be mounted on or removed from the container 203. For example, for a twistlock that requires simple operations to be removed, when rotating it to a position aligned with a notch of a container 203, for example, by rotating 90°, the robot 300 can operate the apparatus 100 to move downward to remove the twistlock 100. For twistlocks that require complicated operations to be removed, as long as they can be firmly clamped and rotated by the apparatus 100, the robot 300 can also perform corresponding operations to remove the twistlocks.

That is, the robot 300 has multiple degrees of freedom that can drive the apparatus 100 to rotate about a plurality of axes and/or translate in a plurality of directions, which can be achieved by using common industrial robots. More importantly, in addition to the degrees of freedom of the robot 300 itself, the apparatus 100 also has at least two degrees of freedom. The at least two degrees of freedom comprise the degree of translational freedom to drive the left and right parts of the clamping assembly 101 close to and away from each other and the degree of rotational freedom for rotating the clamped twistlock 200. Through the two degrees of freedom that complement the degrees of freedom of the robot 300, the apparatus 100 can be controlled more flexibly and avoid interference with the container 203 or twistlock 200 due to the larger size of the robot 300.

The two degrees of freedom may be embodied by suitable mechanisms of the operating assembly 102. For example, in some embodiments, the operating assembly 102 may comprise a translating mechanism 1021 and a rotating mechanism 1022. The translating mechanism 1021 is adapted to drive a pair of clamping portions, for example the left and right parts in some embodiments, to move away or close to each other to clamp or release the twistlock 200.

Besides the above two degrees of freedom, the apparatus 100 may also have other degrees of freedom to facilitate the operation of a switch 202 of the twistlock 200. In some embodiments, these other degrees may be embodied by a switch operating assembly 103. For example, in some embodiments, the switch operating assembly 103 may comprise at least one sub-assembly adapted to operate different switches of the plurality of types of twistlocks. In this way, the twistlock 200 can be unlocked to be rotated by the operating assembly 102. By using the switch operating assembly 103, the apparatus 100 can be applied to more twistlocks with switches, thereby further expanding the apparatus's application scope.

Figure 8:
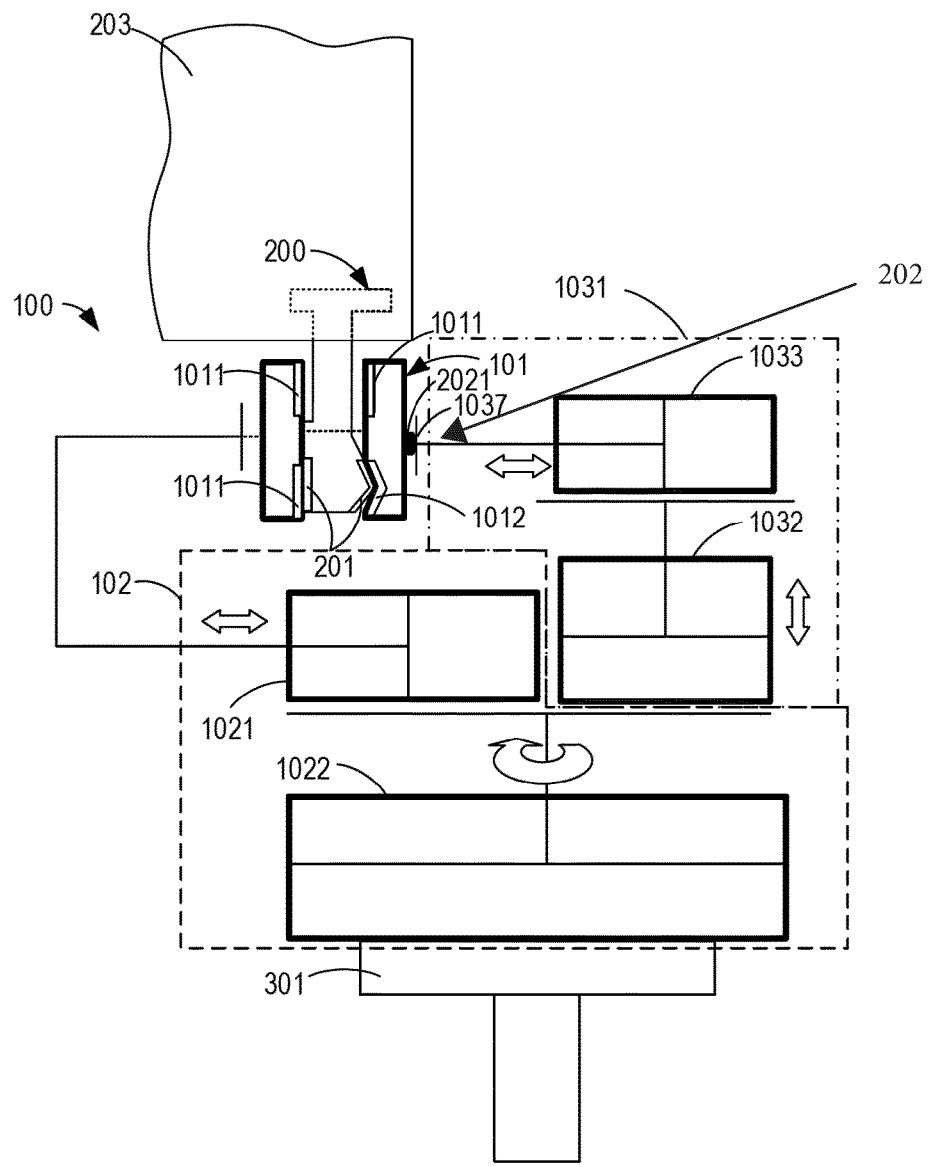
FIGS. 8-10 show simplified views of an apparatus for operating a twistlock according to other embodiments of the present disclosure.

In some embodiments, for those twistlocks with a switch 202, namely a first switch 2021, that needs to be pulled or pushed to be unlocked, the switch operating assembly 103 may comprise a first switch sub-assembly 1031. The first switch sub-assembly 1031 can be coupled to the first switch 2021 and operate the coupled first switch 2021 to unlock the switch 202, as shown in FIG. 8. In this way, the twistlock 200 is allowed to be rotated by the operating assembly 102. This arrangement makes the apparatus 100 applicable to the twistlocks with the first switch 2021, and improves the applicability of the apparatus 100.

In some embodiments, the first switch sub-assembly 1031 may comprise a first effector 1037, a first driving component 1032 and a first operating component 1033. The first effector 1037 is used to approach and be coupled to the first switch 2021. "Couple" herein refers to a certain positional relationship between two objects coupled to each other, which facilitates a further operation. For example, the first effector 1037 being coupled to the first switch 2021 may refer to the first effector 1037 abutting against or contacting the first switch 2021 to facilitate further operation of the first effector 1037 to the first switch 2021.

In some embodiments, the first driving component 1032 can drive the first effector 1037 to be coupled to the first switch 2021 by translation. After being coupled to the first switch 2021, the first effector 1037 may be driven by the first operating component 1033 to drive the coupled first switch 2021 to translate, i.e., to push or pull the first switch 2021 to an unlocked position.

It can be seen from the above description that to unlock the first switch 2021, two more degrees of freedom may be introduced. One of the two degrees of freedom for the first switch 2021 is a translational movement of the first effector 1037 to approach and be coupled to the first switch 2021, and another is a translation of the first effector 1037 to drive the coupled first switch 2021 to the unlocked position. In this way, the apparatus 100 can be applicable to the twistlocks with the first switch 2021, thereby improving the applicability of the apparatus 100.

Figure 9:
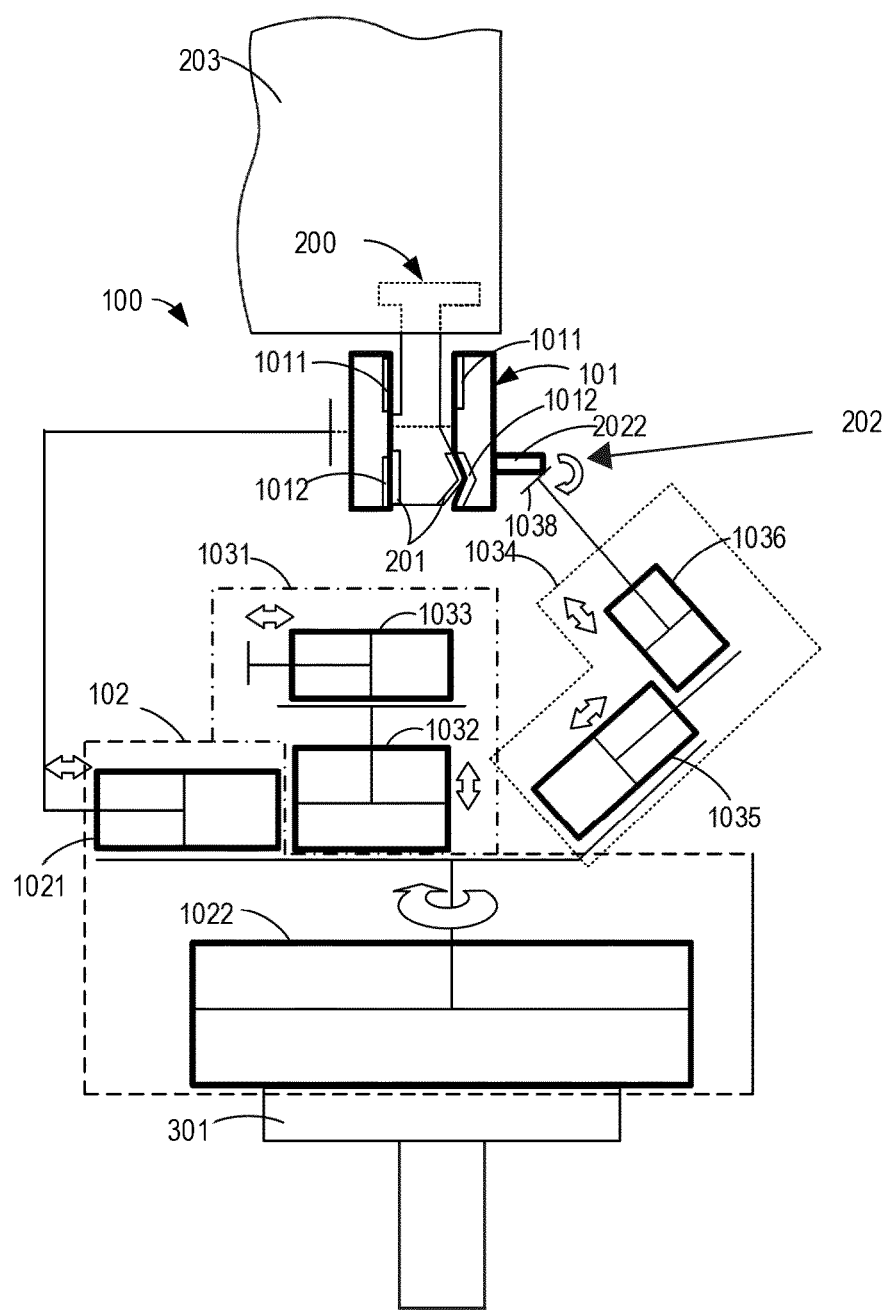

Alternatively or additionally, in some embodiments, for those twistlocks with a switch 202, namely a second switch 2022 which needs to be rotated by a certain angle to be unlocked, the switch operating assembly 103 may also comprise a second switch sub-assembly 1034. The second switch sub-assembly 1034 can be coupled to the second switch 2022 and operate the coupled second switch 2022 to unlock the second switch 2022, as shown in FIG. 9. Similarly, this arrangement also makes the apparatus 100 applicable to the twistlocks with the second switch 2022, and further improves the applicability of the apparatus 100.

For example, in some embodiments, the first switch sub-assembly 1034 may comprise a second effector 1038, a second driving component 1035 and a second operating component 1036. The second effector 1038 is used to approach and be coupled to the second switch 2022. Similarly, the second effector 1038 being coupled to the second switch 2022 may refer to the second effector 1038 abutting against or contacting the second switch 2022 to facilitate a further operation of the second effector 1038 to the second switch 2022.

In some embodiments, the second driving component 1035 can drive the second effector 1038 to be coupled to the second switch 2022 by translation. To facilitate the approaching of the second effector 1038 to the second switch 2022, in some embodiments, a first translation direction of the second effector 1038 approaching the second switch 2022 can be inclined by a certain angle relative to a clamping direction of the clamping assembly 101. That is, the first translation direction of the second effector 1038 may not be perpendicular to or not parallel to the clamping direction of the clamping assembly 101. This arrangement can facilitate the coupling of the second effector 1038 and the second switch 2022.

After being coupled to the second switch 2022, the second effector 1038 may be driven by the second operating component 1036 to drive the coupled second switch 2022 to rotate to an unlocked position. For example, in some embodiments, the second switch 2022 may be pivotally mounted on the body of the twistlock 200 through a rotating shaft. The second effector 1038 may push a free end of the second switch 2022 to cause the second switch 2022 to rotate around the rotating shaft. In this way, the second switch 2022 is operated to be unlocked.

A second translation direction of the second effector 1038 to operate the second switch 2022 may be in any suitable direction, as long as it can facilitate the operation of the second effector 1038 to the second switch 2022. For example, in some embodiments, the second translation direction may be perpendicular to the first translation of the second effector 1038. In some alternative embodiments, the second translation direction may also be at any angle between 0-90° to the first translation direction of the second effector 1038.

It can be seen from the above that to unlock the second switch 2022, two more degrees of freedom are introduced. In some embodiments, one of the two degrees of freedom for the second switch 2022 is the translational movement of the second effector 1038 to approach the second switch 2022, and another is a translational movement of the second effector 1038 to operate the first switch 2021 to the unlocked position. In this way, the apparatus 100 can be applicable to the twistlocks with the second switch 2022, thereby further improving the applicability of the apparatus 100.

Figure 10:
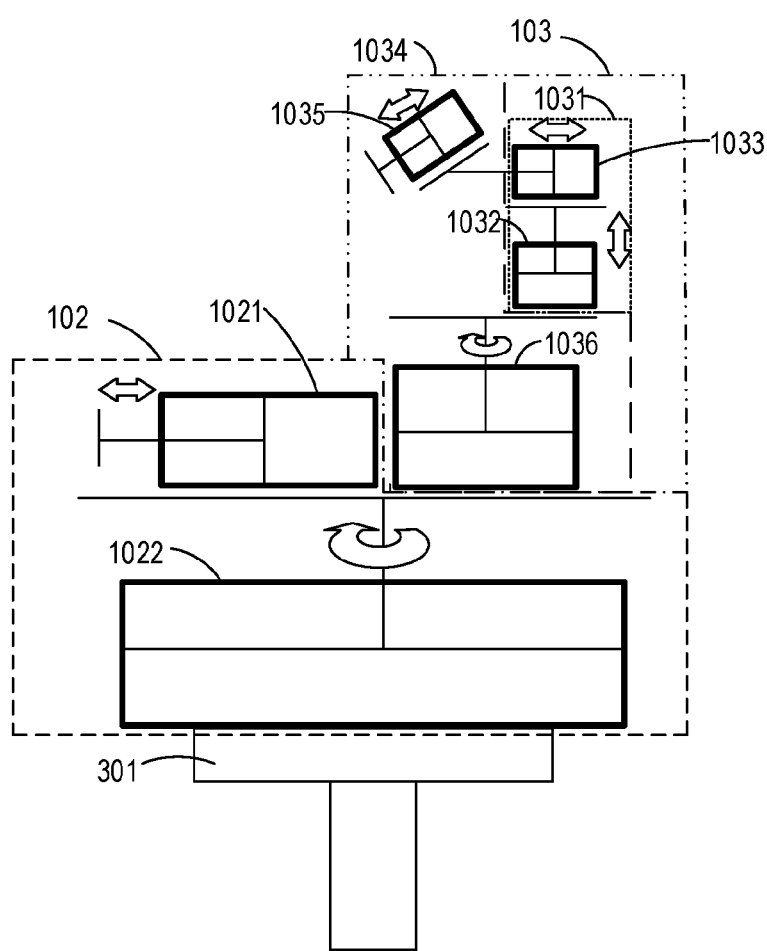
Figure 11:
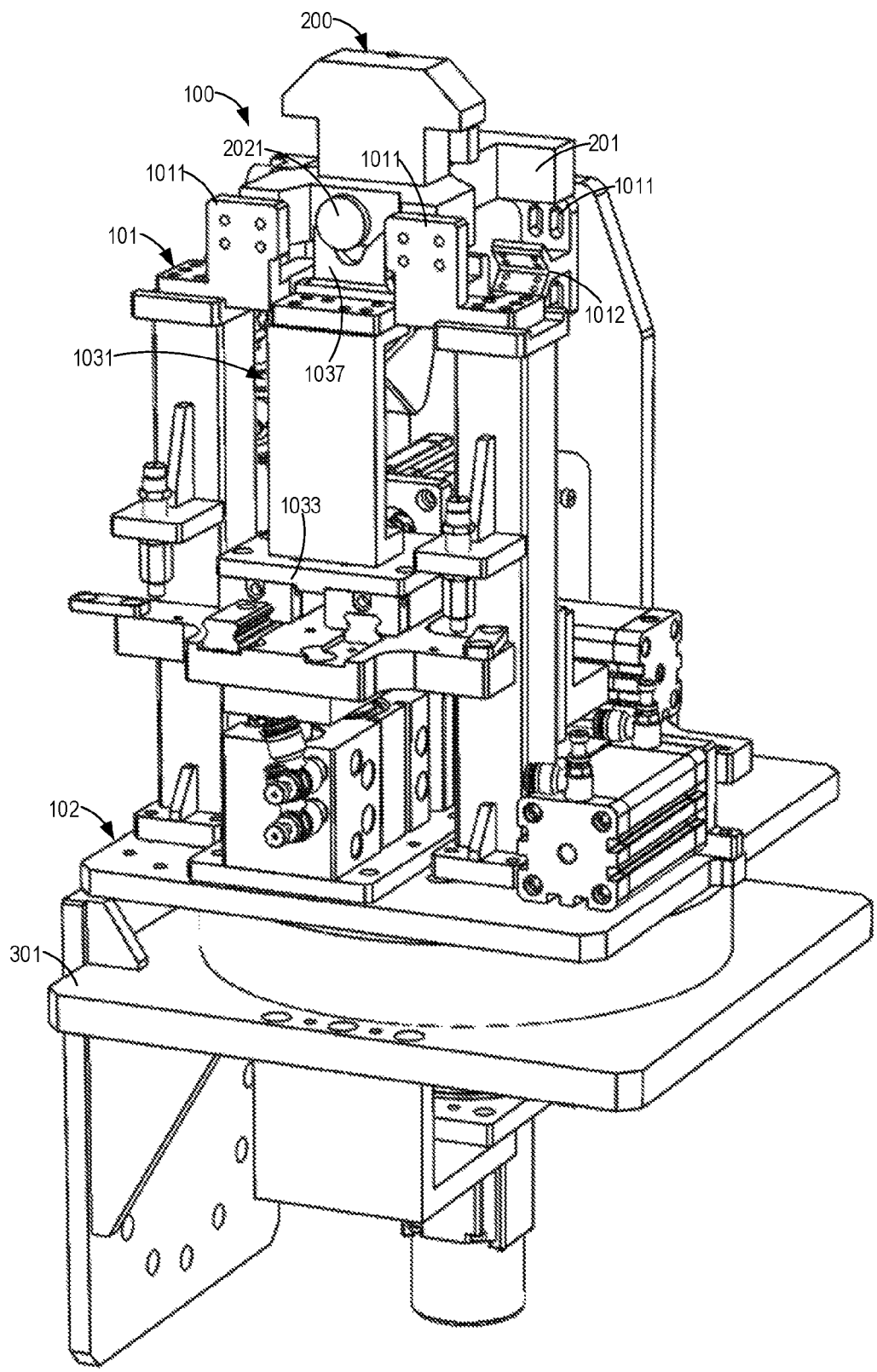
FIGS. 11-14 show perspective views of an apparatus for operating a twistlock according to example embodiments of the present disclosure.
Figure 12:
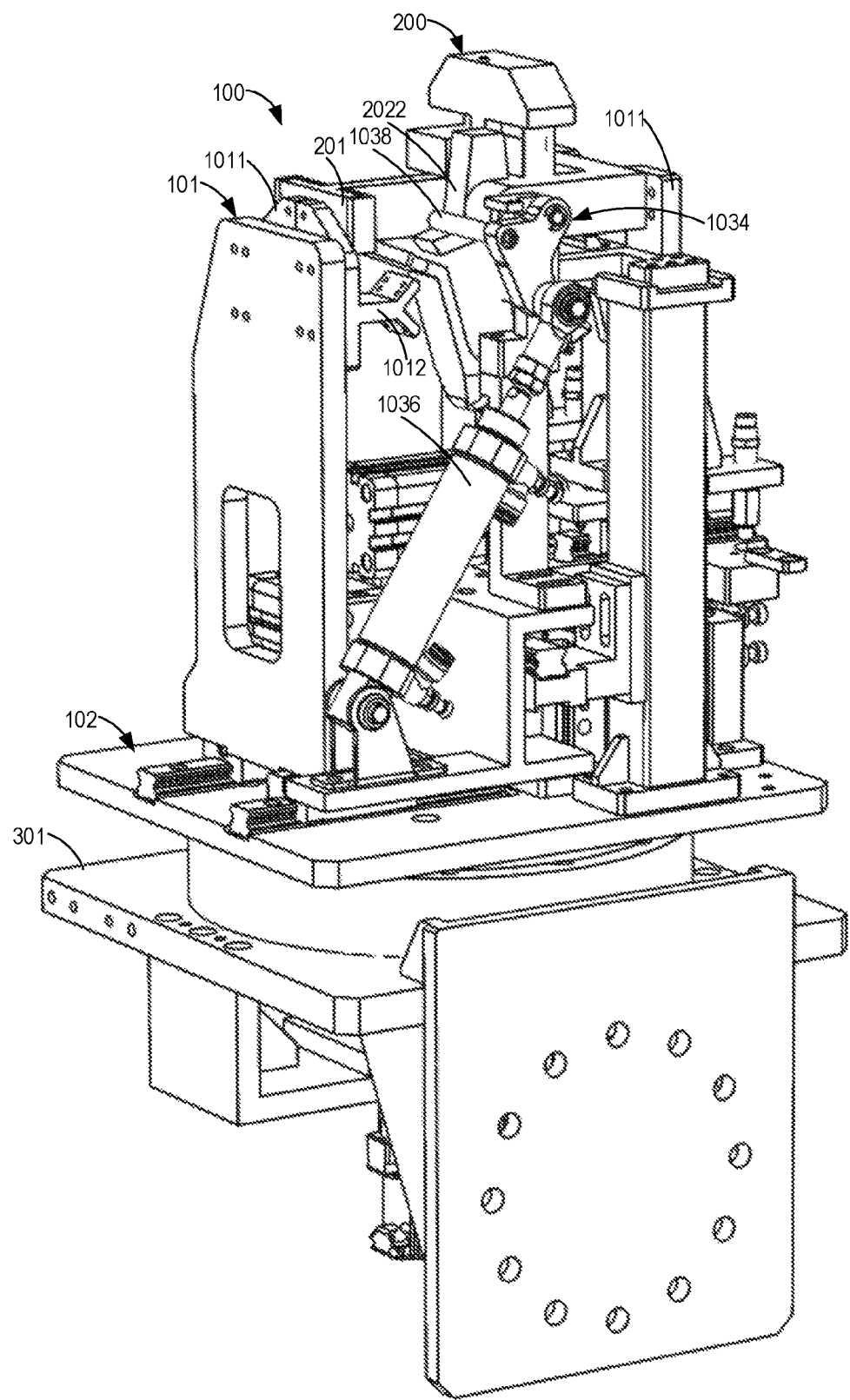
Figure 13:
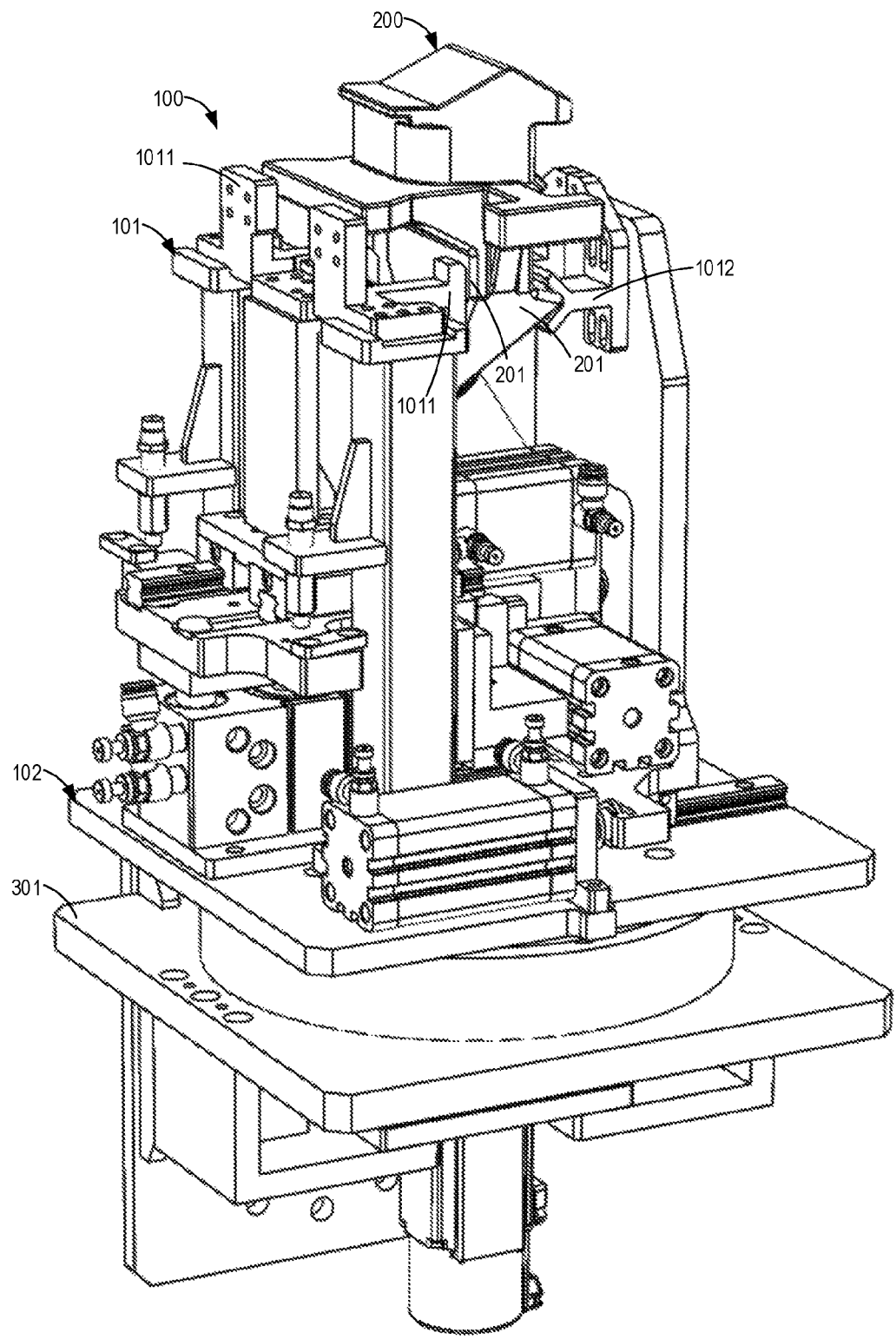
Figure 14:
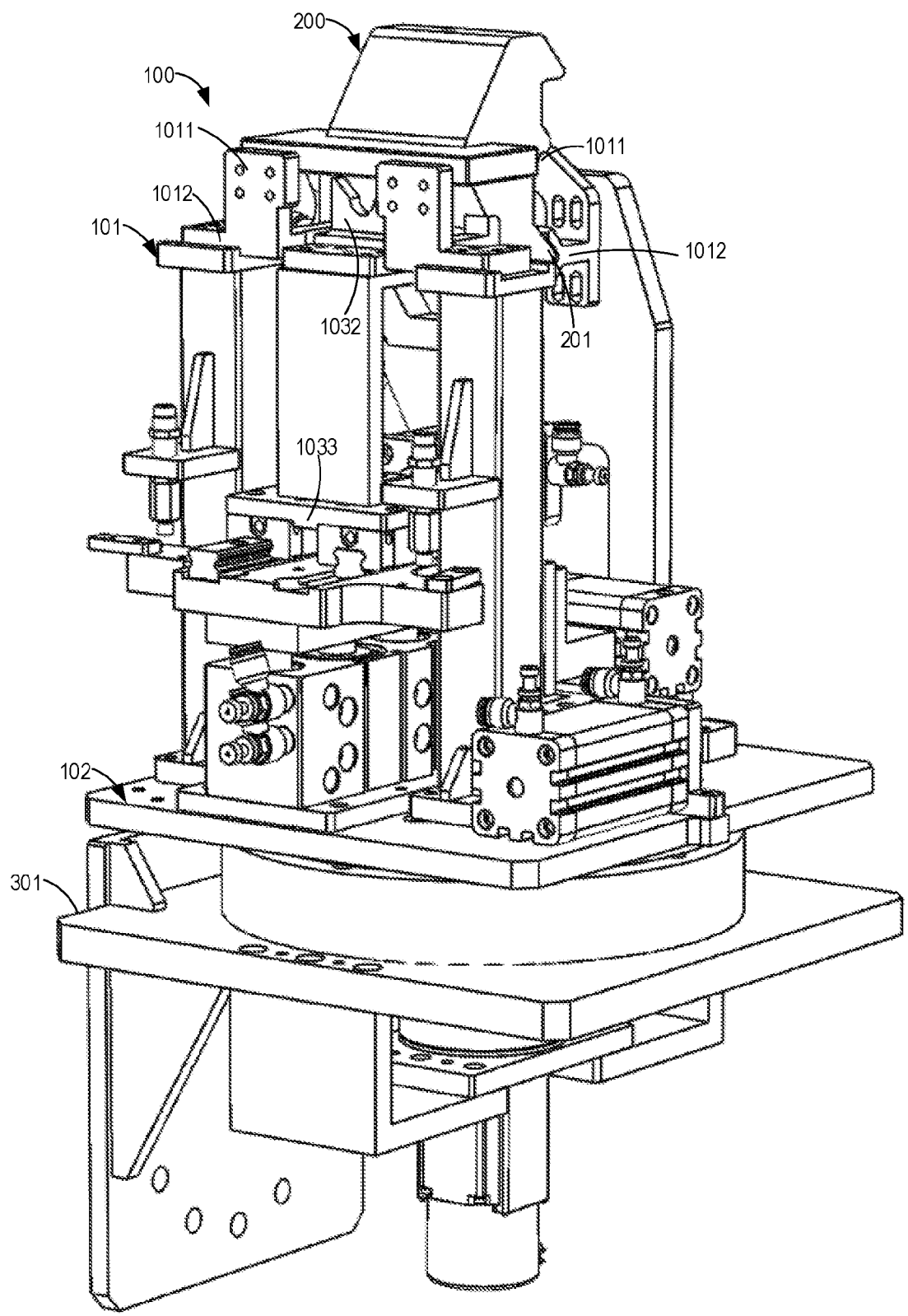

The two degrees of freedom for the first switch 2021 and the two degrees of freedom for the second switch 2022 as mentioned above can be achieved by any suitable means. FIG. 10 shows other possibilities to achieve the above four degrees of freedom. As shown in FIG. 10, one of the four degrees of freedom may be replaced by a degree of rotational freedom. In additional, the degree of the rotational freedom may be achieved by any suitable component such as a first driving component 1032, a second driving component 1035, a first operating component 1033 or a second operating component 1036.

For example, in some embodiments, the degree of the rotational freedom may be achieved by the second operating component 1036. In those embodiments, the second operating component 1036 may drive at least one of the second driving component 1035 or the first switch sub-assembly 1031 to rotate. With three degrees of translational freedom and a degree of rotational freedom for the first and second switches, the apparatus 100 can be applied to most of the twistlocks with switches.

By introducing six degrees of freedom as mentioned above, the apparatus 100 can be operated more flexibly so that it can be applied to most twistlocks, thereby improving the applicability of the apparatus 100. It is to be understood that as long as the twistlock 200 can be firmly clamped and the switch 202 of the twistlock 200 can be unlocked, any suitable type of twistlocks can be operated by the apparatus 100. For example, by using the six degrees of freedom of the apparatus 100 and the degrees of freedom of the robot 300, the apparatus 100 is suitable for the twistlocks mentioned above that need to be rotated, deflected and/or tilted at a certain angle to be removed from the container.

The mechanism or components such as the translating mechanism 1021, the rotating mechanism 1022, the first or second driving component 1035, or the first or second operating component 1036, that achieves the above six degrees of freedom can be implemented in any appropriate manner. FIGS. 11-14 show perspective views of an apparatus 100 for operating a twistlock 200 according to example embodiments of the present disclosure. As shown in FIGS. 11-14, in some embodiments, the mechanism or component, such as the translating mechanism 1021, the first or second driving component 1035, or the first or second operating component 1036, that achieves the degree of translational freedom may comprise a cylinder-piston mechanism.

For example, in some embodiments, the translating mechanism 1021 may comprise the cylinder-piston mechanism. A cylinder drives the piston to push the left and/or right parts of the clamping assembly 101 to translate to achieve the clamping of the twistlock 200. There may be suitable structures such as mounting plates or the like between the piston and the clamping assembly 101 to facilitate the coupling of the piston to the clamping assembly 101.

Alternatively or additionally, in some embodiments, the mechanism or component that achieves the degree of translational freedom may comprise a motor and a lead screw. The translation component such as the first or second pair of clamping portions 1012 or the first or second effector 1038 may be coupled to a lead screw which is coupled to an output shaft of a motor. The rotation of the output shaft drives the lead screw to rotate around its own axis. In this way, the component, such as the first or second pair of clamping portions 1012 or the first or second effector 1038, coupled to the lead screw realizes translational movement.

In some embodiments, the apparatus 100 may comprise both of the cylinder-piston mechanism and the motor. That is, in some embodiments, some mechanisms or components that achieve the degrees of translational freedom may comprise cylinder-piston mechanisms and others may comprise motors and lead screws, which make the arrangement of the apparatus 100 more flexible.

Alternatively or additionally, the mechanism or component, such as the rotating mechanism 1022, etc., that achieves the degree of rotational freedom may comprise a servo motor. The servo motor can obtain information about a rotation angle of an output shaft of the servo motor during operation, which enables accurate control of the servo motor, further improving the reliability of the apparatus 100 in operating the twistlock 200.

It is to be understood that the embodiments where the mechanism or component that achieves the degree of rotational freedom comprises a servo motor are merely for illustrative purposes, without suggesting any limitation as to the scope of the present disclosure. Other suitable components or assemblies that can obtain information about the rotation angle may also be possible. For example, in some embodiments, an assembly comprising an ordinary motor and an encoder can also be used to achieve the degree of rotational freedom.

Embodiments of the present disclosure further disclose a robot 300. The robot 300 comprising the apparatus 100 as mentioned above. With the apparatus 100, the robot 300 can operate most types of twistlocks without changing the clamping component or clamping assembly 101. In this way, the operating efficiency is significantly improved, and the cost is significantly reduced.

Figure 15:
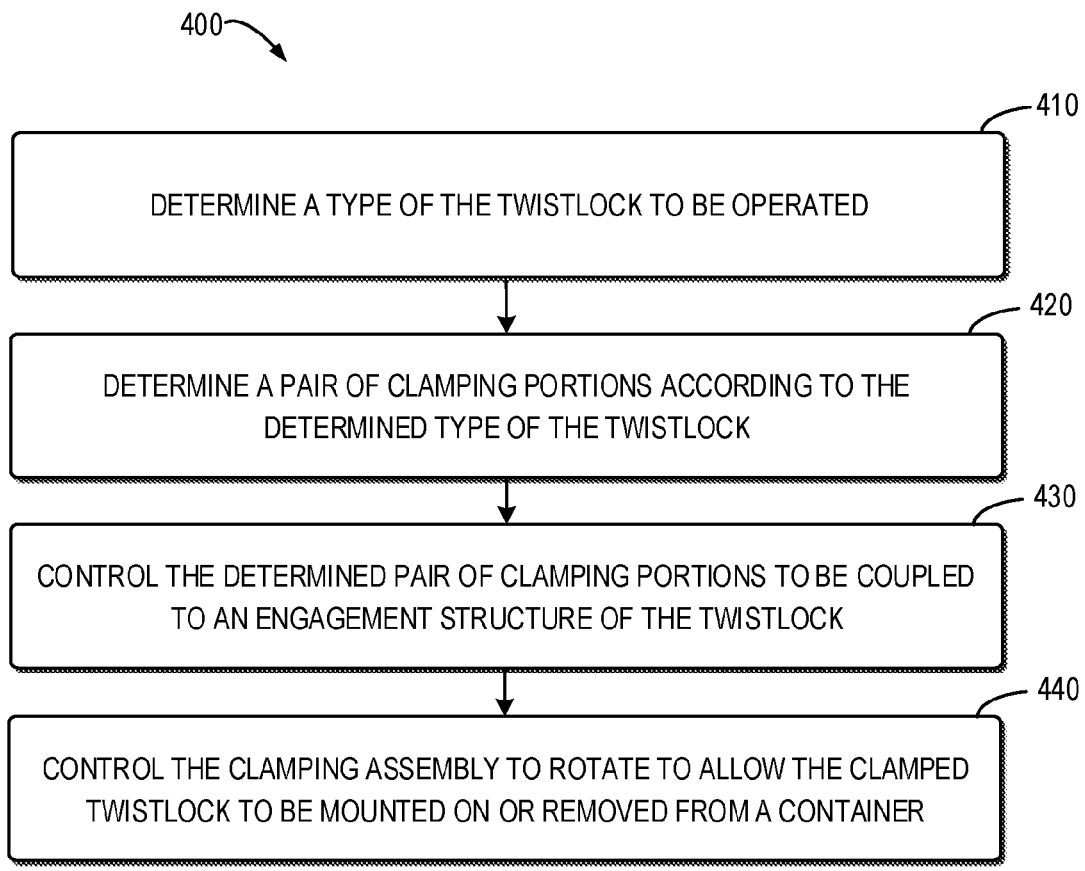
FIG. 15 shows a flowchart illustrating a method of operating a twistlock with a robot according to embodiments of the present disclosure.

According to other aspects of the present disclosure, a method of operating a twistlock 200 with a robot 300 is provided. FIG. 15 shows a flowchart illustrating a method of operating a twistlock 200 with a robot 300 according to embodiments of the present disclosure. The method can be implemented as program codes stored in a memory, which can be performed by a controller of the robot 300 or any other suitable controller or processor.

At block 410, the controller determines a type of the twistlock 200 to be operated. The determination of the type may be achieved in any suitable manner. For example, in some embodiments, the apparatus 100 or the robot 300 may comprise a camera to obtain images of the twistlocks. The controller can determine the type of the twistlock 200 by analyzing the images provided by the camera. In some alternative embodiments, each twistlock 200 may be provided with a label such as a QR code label, near field control label, etc., for indicating or storing information about the type of twistlock 200. The apparatus 100 and/or the robot 300 may comprise a sensor such as a camera or an inductor to obtain the information about the type of twistlock 200 and provide the obtained information to the controller. In this way, the type of twistlock 200 can be determined more easily.

At block 420, after the type of twistlock 200 is determined, the controller determines a pair of clamping portions of the clamping assembly 101 to operate the twistlock 200 according to the determined type of twistlock 200. At block 430, the determined pair of clamping portions is controlled to be coupled to the twistlock 200, such as to an engagement portion thereof.

At block 440, the clamping assembly 101 is controlled to rotate to allow the clamped twistlock 200 to be mounted on or removed from the container 203. For a certain type of twistlock, in addition to the rotation, operations such as deflection and tilting can also be performed. These rotation, deflection and tilt operations can not only utilize the degrees of freedom of the apparatus 100, but also the degrees of freedom of the robot 300. That is, in some embodiments, the controller may also control the apparatus 100 to rotate about at least one axis and/or to translate in at least one direction. In this way, the twistlock can be operated more efficiently.

In some embodiments, to operate the twistlock 200 with a switch 202, the controller may also determine the sub-assembly of the switch operating assembly 103 according to the determined type of twistlock 200. Then the controller can control the determined sub-assembly to operate the switch 202 to unlock the switch 202. In this way, the twistlock 200 can be rotated by the operating assembly 102. As a result, the apparatus 100 can be applicable to the twistlocks with switches, thereby improving the applicability of the apparatus 100 and the robot 300.

It should be appreciated that the above detailed embodiments of the present disclosure are only to exemplify or explain principles of the present disclosure and not to limit the present disclosure. Therefore, any modifications, equivalent alternatives and improvements, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. An apparatus for operating a twistlock, comprising:
   a clamping assembly comprising:
      a plurality of pairs of clamping portions spaced apart by different distances and adapted to engage with different types of twistlocks, respectively, comprising:
         a first pair of clamping portions spaced apart by a first distance and adapted to engage a first type of twistlock; and
         a second pair of clamping portions spaced apart by a second distance and adapted to engage a second type of twistlock;
            wherein the second type of twistlock is different than the first type of twistlock;
   a controller adapted to select one of the first pair of clamping portions or the second pair of clamping portions in response to determining a type of a twistlock in use; and
   an operating assembly adapted to drive the selected one of the first pair of clamping portions or the second pair of clamping portions to clamp the twistlock as determined and to drive the clamped twistlock to rotate, to allow the clamped twistlock to be mounted on or removed from a container.

2. The apparatus of claim 1, wherein the operating assembly comprises:
   a translating mechanism adapted to drive one of the plurality of pairs of clamping portions to move away or close to each other to clamp or release the twistlock; and
   a rotating mechanism adapted to drive the clamped twistlock to rotate.

3. The apparatus of claim 1, further comprising:
   a switch operating assembly comprises at least one sub-assembly adapted to operate different switches of the different types of twistlocks to allow the twistlock to be rotated by the operating assembly.

4. The apparatus of claim 3, wherein the switch operating assembly comprises:
   a first switch sub-assembly adapted to be coupled to a first switch of a first type of twistlocks and to operate the coupled first switch to allow the twistlock to be rotated.

5. The apparatus of claim 4, wherein the first switch sub-assembly comprises:
   a first effector;
   a first driving component adapted to drive the first effector to be coupled to the first switch; and
   a first operating component adapted to drive the coupled first switch to translate to an unlocked position, to allow the twistlock to be rotated.

6. The apparatus of claim 4, wherein the switch operating assembly further comprises:
   a second switch sub-assembly adapted to be coupled to a second switch of a second type of twistlocks and to operate the coupled second switch to allow the twistlock to be rotated.

7. The apparatus of claim 6, wherein the second switch sub-assembly comprises:
   a second effector;
   a second driving component adapted to drive the second effector to be coupled to the second switch; and
   a second operating component adapted to drive the coupled second switch to rotate to an unlocked position, to allow the twistlock to be rotated.

8. The apparatus of claim 7, wherein the second operating component adapted to drive at least one of the second driving component or the first switch sub-assembly to rotate.

9. The apparatus of claim 1, wherein the plurality of pairs of clamping portions are adapted to engage with the different types of twistlocks at different distances from the container.

10. The apparatus of claim 1, wherein the operating assembly is adapted to be coupled to a tool flange of a robot, to enable the robot to drive the apparatus to rotate and/or translate.

11. The apparatus of claim 10, wherein the operating assembly is coupled to the tool flange to allow the robot to drive the apparatus to rotate about a plurality of axes and/or to translate in a plurality of directions.

12. A robot for operating a twistlock, comprising an apparatus of claim 1.

13. A method of operating a twistlock with the robot of claim 12, comprising:
   determining a type of the twistlock to be operated;
   determining a pair of clamping portions according to the determined type of the twistlock;
      wherein the pair of clamping portions of an apparatus are selected from at least one of:
         a first pair of clamping portions adapted to engage a first type of twistlock;
         a second pair of clamping portions adapted to engage a second type of twistlock;
            wherein the first pair of clamping portions and the second pair of clamping portions are disposed on the apparatus;
   controlling the determined pair of clamping portions to be coupled to the twistlock; and controlling the clamping assembly to rotate to allow the clamped twistlock to be mounted on or removed from a container.

14. The method of claim 13, further comprising:

determining a sub-assembly from a switch operating assembly according to the determined type of the twistlock;

controlling the determined sub-assembly to operate the switch of the twistlock to allow the twistlock to be rotated by the operating assembly.

15. The method of claim 13, further comprising:

controlling the apparatus to rotate about at least one axis and/or to move in at least one direction.

16. The apparatus of claim 2, further comprising:

a switch operating assembly comprises at least one sub-assembly adapted to operate different switches of the different types of twistlocks to allow the twistlock to be rotated by the operating assembly.

17. The apparatus of claim 5, wherein the switch operating assembly further comprises:

a second switch sub-assembly adapted to be coupled to a second switch of a second type of twistlocks and to operate the coupled second switch to allow the twistlock to be rotated.

18. The apparatus of claim 2, wherein the plurality of pairs of clamping portions are adapted to engage with the different types of twistlocks at different distances from the container; or wherein the operating assembly is adapted to be coupled to a tool flange of a robot, to enable the robot to drive the apparatus to rotate and/or translate.

19. The apparatus of claim 4, wherein the plurality of pairs of clamping portions are adapted to engage with the different types of twistlocks at different distances from the container; or wherein the operating assembly is adapted to be coupled to a tool flange of a robot, to enable the robot to drive the apparatus to rotate and/or translate.

20. The apparatus of claim 8, wherein the plurality of pairs of clamping portions are adapted to engage with the different types of twistlocks at different distances from the container; or wherein the operating assembly is adapted to be coupled to a tool flange of a robot, to enable the robot to drive the apparatus to rotate and/or translate.

* * * * *